United States Patent [19]

Kuboyama

[11] Patent Number: 5,170,697
[45] Date of Patent: Dec. 15, 1992

[54] EXTRACTION APPARATUS, PROCESS AND PRODUCT PRODUCED THEREBY

[76] Inventor: Nobuyoshi Kuboyama, 96 Litchfield Dr., Carlisle, Mass. 01741

[21] Appl. No.: 884,927

[22] Filed: May 18, 1992

Related U.S. Application Data

[62] Division of Ser. No. 791,665, Nov. 12, 1991.

[51] Int. Cl.[5] .................... A23L 1/34; A23L 3/00; C12C 7/04
[52] U.S. Cl. ...................... 99/470; 99/278; 99/471; 99/476; 99/495; 99/516
[58] Field of Search .......... 99/467, 470, 471, 473–476, 99/483, 487, 488, 495, 516, 517, 534, 536, 277, 278; 435/287, 302, 316, 309, 305, 306, 93

[56] References Cited

U.S. PATENT DOCUMENTS

| | | | |
|---|---|---|---|
| 2,278,701 | 4/1942 | Karr | 99/471 |
| 3,640,206 | 2/1972 | Moisescu et al. | 99/470 |
| 3,703,200 | 11/1972 | Palyi et al. | 99/630 |
| 3,717,086 | 2/1973 | Hough | 99/471 |
| 3,989,848 | 11/1976 | Moll et al. | 99/278 |
| 4,108,052 | 8/1978 | Cunningham | 426/244 |
| 4,255,459 | 3/1981 | Glen | 99/470 |
| 4,344,975 | 8/1982 | Seiler | 99/324 |
| 4,661,449 | 4/1987 | Billon | 435/312 |
| 4,699,797 | 10/1987 | Fast | 426/508 |
| 4,962,700 | 10/1990 | Skobic et al. | 99/470 |

FOREIGN PATENT DOCUMENTS 2-023857 1/1990 Japan .................... 99/470

*Primary Examiner*—Timothy F. Simone
*Attorney, Agent, or Firm*—Barry R. Lipsitz

[57] ABSTRACT

A consecutive extraction device for extracting an extract of an effective ingredient of malt, malted rice or malted soybean is provided. An extract of the effective ingredient of malt, malted rice or malted soybean in the liquid state and a process for using the extract of the effective ingredient to improve the quality of food are also provided.

4 Claims, 4 Drawing Sheets ized dew to yield the
EXTRACTION APPARATUS, PROCESS AND PRODUCT PRODUCED THEREBY This application is a division of co-pending U.S. patent application Ser. No. 07/791,665 filed on Nov. 12, 1991.

FIELD OF THE INVENTION

This invention relates to a sequential extraction apparatus, to a process for extracting and separating an effective ingredient from partly germinated and dried barley, rice or soybeans, to the extract obtained and to a technique for using the extract.

BACKGROUND OF THE INVENTION

Partially germinated and dried barley, rice or soybeans have been used for the production of liquors and seasonings since ancient times. Partially germinated and dried barley is generally known as malt. As used herein, partially germinated and dried rice is called "malted rice" and partially germinated and dried soybeans are called "malted soybeans". The partial germination process produces mold in the barley, rice or soybean material.

Malt, malted rice and malted soybeans can be used to resolve starch into sugar and/or protein into amino acid by fermentation of the mold. Accordingly, these malted products have been used to brew liquors, miso (bean paste), soy and the like as well as in the production of pickles, confectionary and the like, primarily in East Asian countries.

In particular, the ferment of malted rice and malted soybeans, which is mainly amylase, can be used to resolve starch into sugar, to resolve protein into amino acid and to improve the smell, taste and other qualities of foods. This third property has also been known since ancient times and is due to the delicate action of certain effective ingredients on the foods. Accordingly, malted rice and malted soybeans have been added to various foods in order to improve the taste and preservation qualities of foods.

However, the use of malted rice and malted soybeans for flavor enhancement and preservation is limited because the malted rice and malted soybeans cause an unpleasant odor and leave traces of the rice and soybeans themselves. Liquid malted rice or liquid malted soybean can be produced by cultivating malted rice mold in rice, wheat, soybeans and the like. However, the use of liquid malted rice or liquid malted soybean remains limited due to the unpleasant odor and the traces that remain.

It is, therefore, desirable to provide techniques for separating and extracting malt, malted rice, and malted soybeans in a liquid material and a technique for using the extract by addition to food.

SUMMARY OF THE INVENTION

A consecutive or sequential extraction apparatus is provided in accordance with the invention. The apparatus includes two or more extract units for extraction malt, malted rice or malted soybeans and a conveyance means for transferring the malt, malted rice or malted soybeans sequentially through the extract units.

The process for extracting the malt, malted rice or malted soybeans includes introducing a vapor, a mist or a mixture of a vapor and a mist at a predetermined temperature into a decompression chamber containing the malt, malted rice or malted soybeans so as to contact the malt, malted rice or malted soybeans and form a dew on the surface of the malt, malted rice or malted soybeans, steeping an effective ingredient of the malt, malted rice or malted soybeans which is present on the surface in the dew, vaporizing the dew, withdrawing the vaporized dew from the decompression chamber and cooling the withdrawn vaporized dew to yield the effective ingredient in a liquid state.

The liquid containing the effective ingredient can be used to improve the quality of foods.

DETAILED DESCRIPTION OF THE PREFERRED EMBODIMENTS

Figure 1:
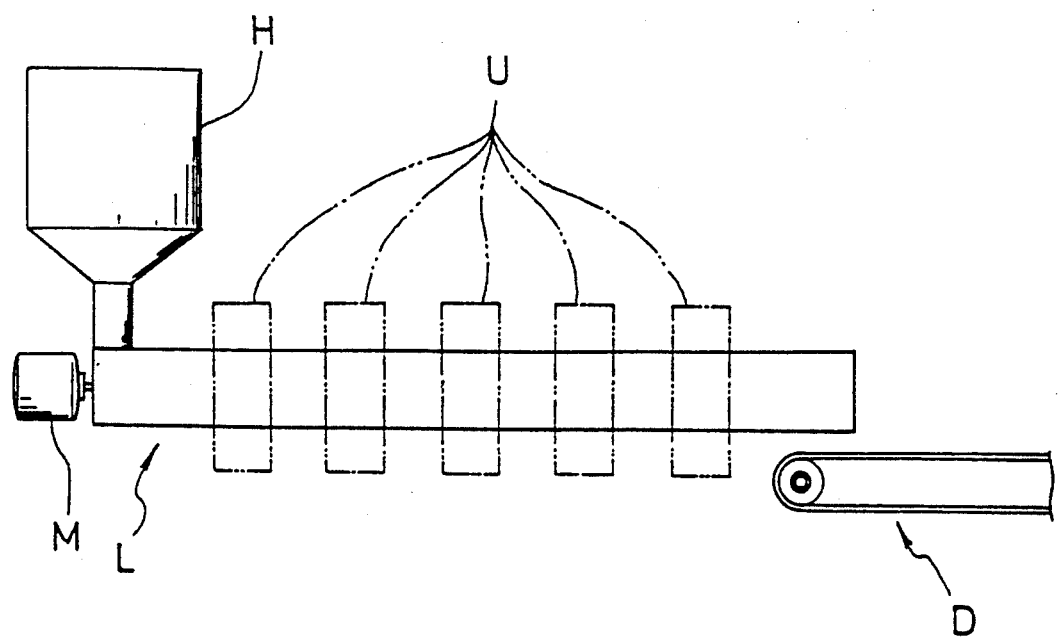
FIG. 1 is a diagram of a consecutive extraction device constructed and arranged in accordance with the invention.

A first embodiment of a consecutive extraction apparatus is shown in FIG. 1. The consecutive extraction device includes multiple extract units U, a hopper H, a conveyance means L, a conveyor D and a motor M. The conveyor D is used to dry malt, malted rice or malted soybeans. The motor M is the driving force for the conveyance means L.

To use the apparatus, malt, malted rice or malted soybeans contained in the hopper H is transferred from the hopper H into the extract units U by the conveyance means L. The effective ingredient is extracted in the extract units U. Following extraction, the malt, malted rice or malted soybeans is transferred to the conveyor D for drying by the conveyance means L.

Figure 2:
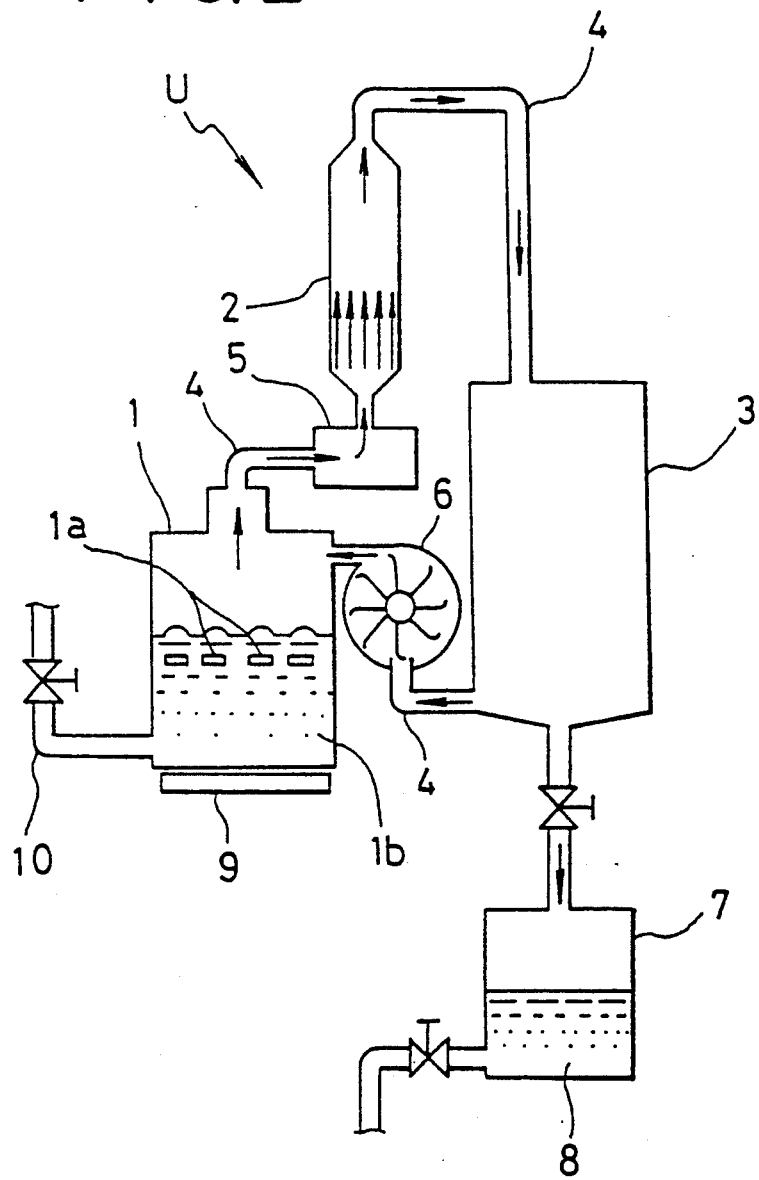
FIG. 2 is a diagram of an extract unit for use in the consecutive extraction device of the invention.
Figure 3:
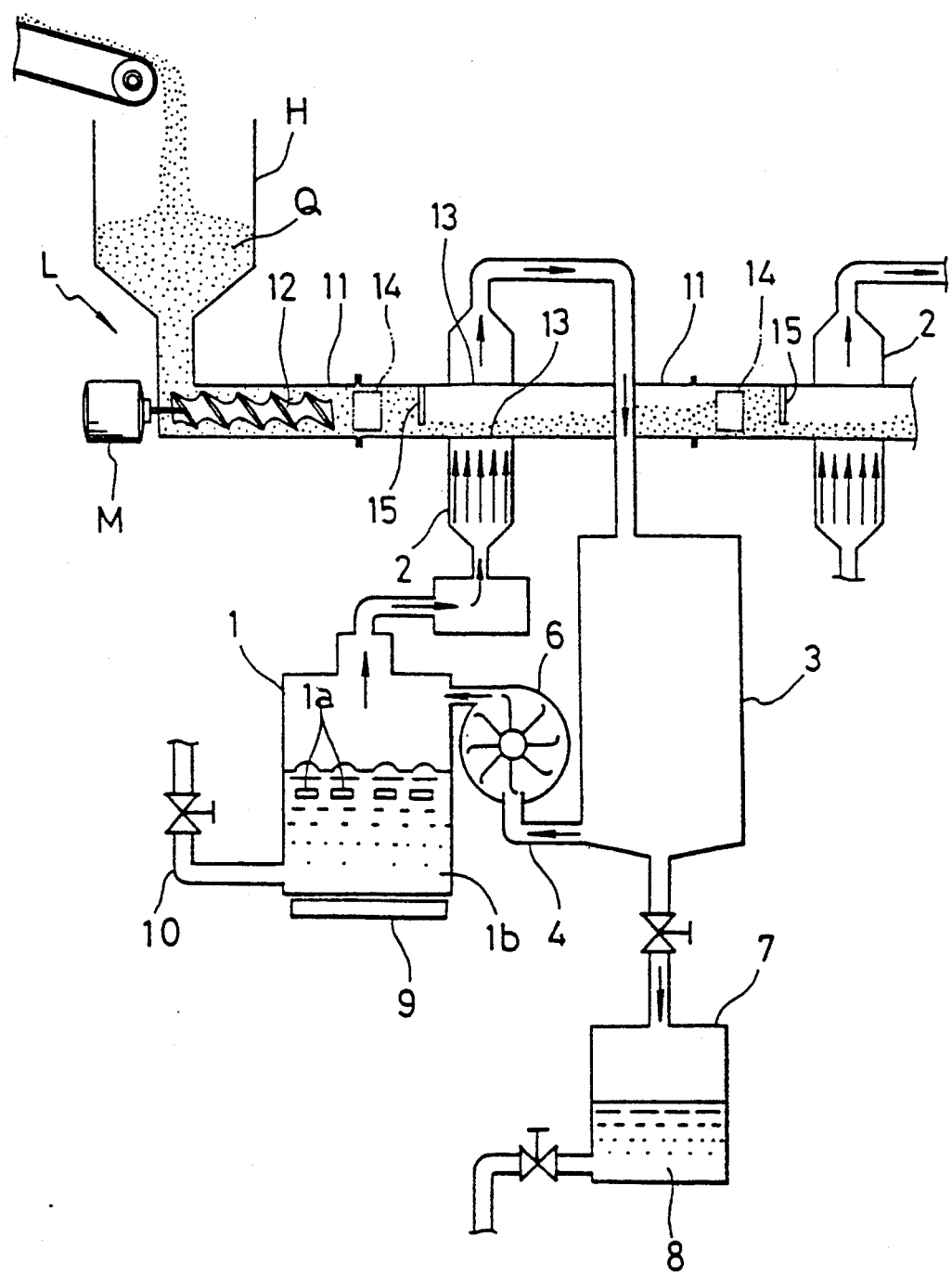
FIG. 3 is a diagram showing the relationship between the extract units and a conveyance means in the device of FIG. 1; and, FIG. 4 is a diagram representing the relationship between a decompression chamber and a conveyance pipe in the device of FIGS. 1 and 3.
Figure 4:
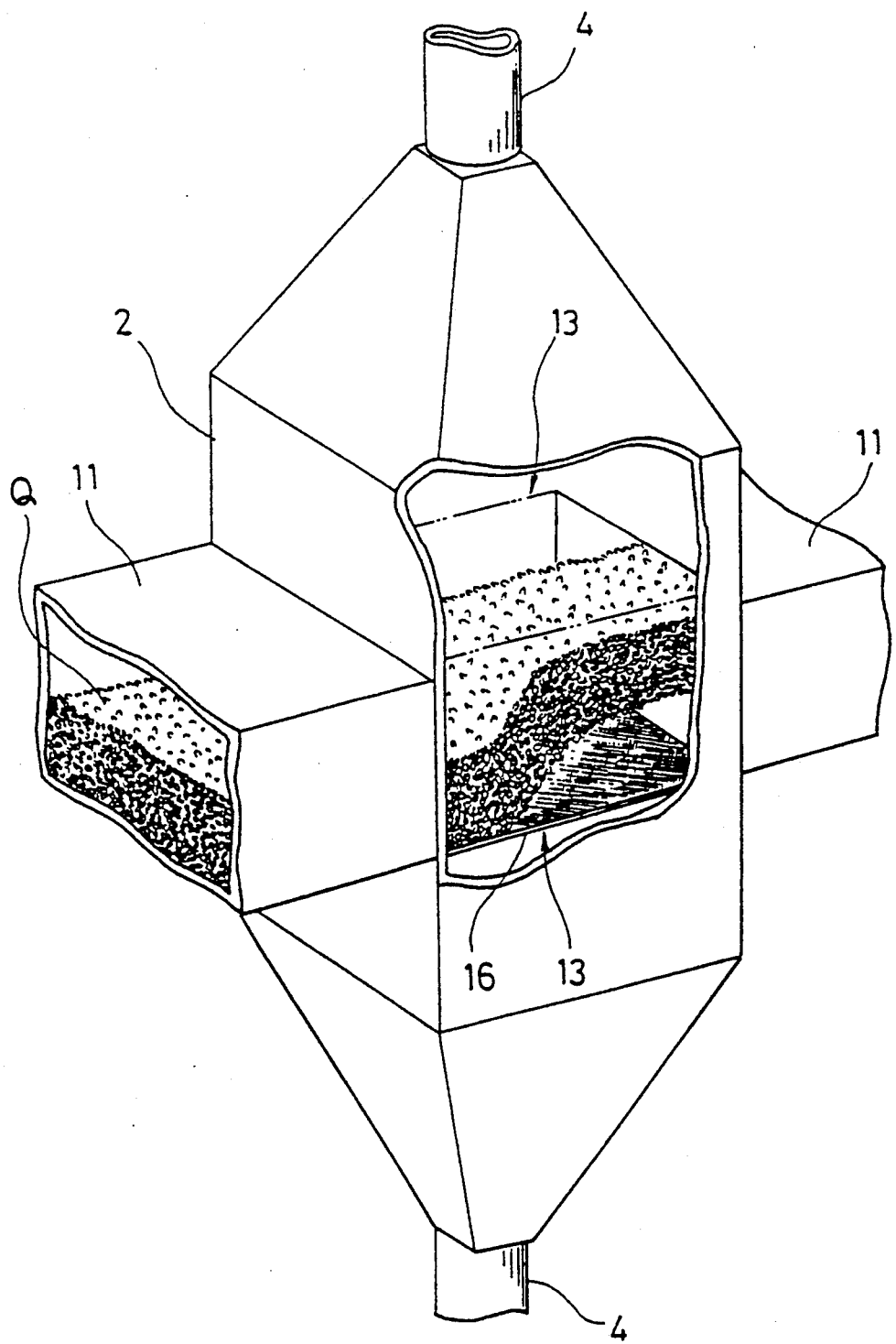

FIG. 2 shows the construction of an individual extract unit U. The extract unit U includes an atomization chamber 1 for preparing a vapor, a mist or a mixture of a vapor and a mist from a liquid material 1b, a rotary fan 6, a decompression chamber 2 in which pressure is reduced by a means such as an absorption pump and a cooling chamber 3. The atomization chamber is connected to the decompression chamber 2 by a circulatory pipe 4, the decompression chamber 2 is connected to the cooling chamber 3 by another circulatory pipe 4 and the cooling chamber 3 is connected to the atomization chamber 1 by yet another circulatory pipe 4. A heater 5 is provided in the circulatory pipe 4 between the atomization chamber 1 and the decompression chamber 2. A rotary fan 6 is provided in the circulatory pipe 4 between the cooling chamber 3 and the atomization chamber 1.

A supply pipe 10 is used to introduce a liquid material 1b into the atomization chamber 1. An oscillating element 1a of an ultrasonic oscillator is provided in the atomization chamber 1 below the surface of the liquid material 1b for the purpose of atomizing the liquid material 1b to form a vapor, a mist or a mixture of a vapor and a mist. A heater 9 is used to heat the liquid material 1b within A tank 7 is in communication with the cooling chamber 3 and is used for storage of the extract 8 obtained from the malt, malted rice or malted soybeans.

In order to extract an effective ingredient from malt, malted rice or malted soybean using the apparatus provided in accordance with the invention, a liquid material 1b is introduced into the atomization chamber 1 and malt, malted rice or malted soybeans are introduced into the decompression chamber 2. The liquid material 1b is heated by a heater 9 and forms a vapor, a mist or a mixture of a vapor and a mist as a result of the action of the oscillating element 1a. The pressure in the decompression chamber 2 is reduced by the action of the rotary fan 6 and the vapor, mist or mixture thereof is drawn from the atomization chamber 1 into the decompression chamber 2 through the circulatory pipe 4. The vapor, mist or mixture is heated further by the heater 5 in the circulatory pipe 4 during this transfer and enters the decompression chamber 2 at a temperature higher than the temperature of the material in the decompression chamber 2.

The vapor, mist or mixture of vapor and mist entering the decompression chamber 2 contacts the malt, malted rice or malted soybean material at the lower temperature and forms a dew on the surface of the material. The portion of the vapor, mist or mixture that fails to contact the material or form a dew on the surface of the material passes through the chamber. At the same time, the effective ingredient of the malt, malted rice or malted soybean material is steeped on the surface of the material due to the action of the reduced pressure within the decompression chamber 2. Accordingly, the dew absorbs the effective ingredient and is revaporized due to the reduced pressure.

The vaporized dew including the effective ingredient and the remaining vapor, mist or mixture is withdrawn into the cooling chamber 3 through the circulatory pipe 4. The vapor, mist or mixture is cooled quickly, liquified within the cooling chamber 3 and dripped into the tank 7 for storage. The extract 8 containing the effective ingredient of the malt, malted rice or malted soybean is stored in the tank 7. The vapor, mist or mixture that is not liquified is reintroduced into the atomization chamber 1 as a result of the action of the rotary fan 6.

FIG. 3 shows the relationship between a conveyance means construction L and an extract unit U. the conveyance means L includes a conveyance pipe 11, a conveyance screw 12 driven by a motor M, a ventilation portion 13, a stirring means 14 and an adjustment board 15. The conveyance pipe 11 penetrates the decompression chamber 2 which is part of the extract unit U. A ventilation portion 13 through which a vapor, mist or mixture passes is provided at the bottom of the conveyance pipe 11 inside the decompression chamber 2. Malt, malted rice or malted soybean Q is introduced from the hopper H into the conveyance pipe 11 by the conveyance screw 12 provided at one side of the conveyance pipe 11 and travels in the direction of the decompression chamber 2.

Stirring devices that are known in the art are provided inside the conveyance pipe 11 and cause the malt, malted rice or malted soybeans to be reduced to pieces so that the vapor, mist or mixture uniformly sticks to the surface in the decompression chamber 2. An adjustment board 15 insures that the thickness of the malt, malted rice or malted soybean is uniform within the decompression chamber 2. Finally, the malt, malted rice or malted soybeans pass through the ventilation portion 13 attached to the conveyance pipe 11 and the vapor, mist or mixture contacts the surface.

FIG. 4 shows the relationship between the conveyance pipe 11 and the decompression chamber 2. The ventilation portion 13 is provided at the bottom of the conveyance pipe 11 that penetrates the decompression chamber 2. A net 16 is provided along a portion of the holes for adjusting the amount of ventilation and thereby the quantity of the vapor, mist or mixture that passes through. A slideable plate 16*a* is provided beneath the net 16. Malt, malted rice or malted soybeans Q are transferred onto the net and the amount of vapor, mist or mixture passing through the net is controlled by manually or automatically sliding the slideable plate 16*a* to change the dimension of the net 16.

Reference is made to FIGS. 1 and 3 to illustrate the operation of the consecutive extract device provided in accordance with the invention. When the device is switched on, the conveyance screw 12 begins to rotate and the extract units begin to operate in the manner described in connection with FIG. 2. Malt, malted rice or malted soybeans are transferred in the direction of the extract units by the conveyance screw 12 and broken into pieces by the stirring device 14. The thickness of the pieces is made uniform by passing under the adjustment board 15 and the pieces are introduced into the decompression chamber 2. At the same time, the vapor, mist or mixture passes through the heater 5 and flows upward into the decompression chamber 2 because the pressure in the decompression chamber has been reduced by the rotary fan 6. The effective ingredient of the malt, malted rice or malted soybean is present on the surface due to the reduced pressure acting on the malt, malted rice or malted soybean and the vapor, mist or mixture forms a dew on the surface. The effective ingredient is absorbed into the dew and the dew is revaporized. The revaporized dew containing the effective ingredient passes through the circulatory pipe 4 provided within the upper area of the decompression chamber 2 and is introduced into the cooling chamber 3 to be liquified. Accordingly, the effective ingredient is extracted from malt, malted rice or malted soybeans within the decompression chamber 2 while transfer of the malt, malted rice or malted soybeans is continued in the conveyance pipe 11.

It has been determined that it takes about seven minutes for the malt, malted rice or malted soybeans to enter and leave the decompression chamber 2. It is also necessary to maintain the temperature of the vapor, mist or mixture entering the decompression chamber at a temperature higher than the temperature of the malt, malted rice or malted soybeans, preferably between 35° and 65° C., during this period. By using a consecutive extraction device having multiple extract units, the effective ingredient can be efficiently extracted from the malt, malted rice or malted soybeans and the extraction condition of maintaining the temperature of the vapor, mist or mixture at a higher temperature can be maintained.

The following Examples are based on use of the consecutive extraction device shown in FIG. 2. These Examples are presented for purposes of illustration and are not intended to be construed in a limiting sense.

EXAMPLES 1-3

A quantity of a liquid material such as pure water and/or ultra pure water was introduced into the atomization chamber 1 through the supply pipe 10. Fifty grams of malted rice that was broken into pieces was provided in the decompression chamber 2. The rotary fan 6 was rotated and the oscillating element of the utrasonic oscillator 1a was oscillated to balance the pressure within the atomization chamber and fix the pressure differential. In other words, the liquid material in the atomization chamber 1 was converted to a vapor, mist or mixture by the action of the oscillating element 1*a* and filled the chamber 1 to generate a desired steam pressure and obtain a pressurized vapor, mist or mixture. Then the vapor, mist or mixture traveled through the circulatory pipe 4 to the decompression chamber 2 and was heated by the heater 5 in the circulatory pipe 4 to activate the molecules. The decompression chamber was maintained in a reduced pressure state by the rotary action of the rotary fan 6. The reduced pressure state could be controlled up to the strength of the rotary fan 6 so that the cellular tissues of the malted rice could be maintained in a natural state without damage.

The vapor, mist or mixture that entered the decompression chamber 2 contacted the malted rice Q at the lower temperature of the malted rice Q and most of the vapor, mist or mixture formed a dew on the surface of the malted rice Q. The portion of the vapor, mist or mixture that did not form a dew passed through the decompression chamber 2 and through the circulatory pipe 4. For this experiment, room temperature malted rice was used, but it is also possible to use cooled malted rice. Because of the action of the reduced pressure within the reduced pressure chamber 2, the effective ingredient of the malted rice steeped onto the surface of the rice and was absorbed into the dew that formed on the surface. The dew containing the effective ingredient was revaporized, introduced into the cooling chamber 3 through the circulatory pipe 4 and quickly cooled in the cooling chamber 3. The revaporized dew was liquified and dripped into the tank 7 for storage to provide the extract 8 containing the effective ingredient of the malted rice. The revaporized dew that was not liquified was transferred to the atomization chamber 1 by the rotary fan 6. The extract 8 is effective for improving the quality of foods to which it is added. The extract 8 can be used in the form in which it is obtained or in diluted form.

for these Examples, 50 g of malted rice was used as the material to be extracted, the pressure in the decompression chamber was reduced to 130 mm Ag, the extraction was carried out for a period of 7 minutes per cycle over 4 cycle for a total extraction period of 28 minutes and 15 cc of extract were obtained per cycle for a total of 60 cc of extract.

In Example 1, the temperature of the vapor, mist or mixture was maintained between 35° and 45° C. In Example 2, the temperature of the vapor, mist or mixture was maintained between 45° and 50° C. In Example 3, the temperature of the vapor, mist or mixture was maintained between 50° and 65° C.

The extract was treated by heating at a temperature between 65° and 80° C. to stop the fermentation process and to sterilize the extract.

The extracts obtained in Examples 1-3 were used by adding to extracts to rice, average grade Japanese sake and bread and the results are described in the following Examples.

EXAMPLE 4

Nine cc of the extract obtained in accordance with Examples 1-3 was added to 540 cc of raw rice and the rice was cooked Japanese style. The taste, chewing sensation, glossiness and smell of the Japanese style cooked rice were improved.

The grains of the Japanese style cooked rice did not stick to each other, the taste at the time of cooking did not change even after a period of time had passed and the color of the rice did not change over time. Furthermore, the Japanese style cooked rice did not produce an offensive odor, did not become tough when cooled and the taste of the rice did not change when the rice was frozen. When the extract was added to old stored rice and the rice was cooked Japanese style, the offensive odor of the old stored rice disappeared.

EXAMPLE 5

Three cc of the extract was added to 180 cc of average grade Japanese sake. The transparency of the sake was increased and the taste and smell of the sake were improved so as to be comparable to the taste and smell of Ginjo sake, a type of Japanese sake produced by carefully fermenting selected rice, or special grade sake. Furthermore, the Japanese sake with the added extract did not cause hangovers in humans.

EXAMPLE 6

The extract together with some yeast was added to bread batter and the batter was baked. The taste and smell of the bread was remarkably improved.

EXAMPLE 7

Carrots and onions were cut into suitable sizes for tempura. Water and flour were mixed to form a paste and some of the extract was added to the paste. The flour paste was applied to the carrots and onions and the carrots and onions were fried. The flavor of the carrot and onion tempura was improved and heartburn resulting from the oil was eliminated.

EXAMPLE 8

The extract was added in the process of producing tofu and the flavor and glutinousness of the resulting tofu was improved.

EXAMPLE 9

The extract was added to meat and the flavor of the meat was improved and the meat was tenderized. Furthermore, addition of the extract to sauce for the meat improved the taste of the sauce.

EXAMPLE 10

The flavor of soy was improved by addition of the extract.

EXAMPLE 11

The flavor of average grade green tea was improved by addition of the extract.

EXAMPLE 12

The flavor and softness to the tongue of UDON, which is a type of wheat vermicelli noodle, spaghetti and macaroni were improved by addition of the extract during the process of producing or cooking the UDON, spaghetti or macaroni.

EXAMPLE 13

When the extract was added to ordinary drinking water, it was found that blood sugar levels were restrained.

EXAMPLES 14-16

In Example 14, the extract was added to beer. The taste and smell of the beer were improved. Furthermore, when the extract was added to stale bear, the beer came to have the same taste and smell as that of fresh beer.

In Example 15, when the extract was added to average grade whiskey, the whiskey came to have the same taste and smell as high grade whiskey.

In Example 16, when the extract was added to tasteless and odorless distilled sake, the sake came to have properties like those of high grade whiskey. Furthermore, the whiskey to which the extract had been added did not cause hangovers in humans.

The extract provided in accordance with the invention has also been found to have numerous other uses. For instance, the extract had a remarkable effect as a cleaner for oil spots on cooking stoves. The extract is also useful as a cleaner for leathercrafts and can be used as an exfolliation material for tearing off labels and stickers. Application of the extract to human skin causes the skin to moisten and become glossy.

EXAMPLE 17

See malted rice was added to malted rice from which the extract had been removed and the seed malted rice was allowed to ferment in the malted rice. Malted rice that was of the same quality as malted rice prepared from rice was produced. Accordingly, it is possible to use the same malted rice as a raw material several times so that the cost of the process of extracting the effective ingredient is low.

Furthermore, malt or malted soybeans can be prepared or used in the Examples described.

The invention described relates to a consecutive extraction apparatus and to techniques for extracting an effective ingredient from malt, malted rice or malted soybeans. An extract is produced by the process described that improves the quality of foods and the properties of various foods are improved by addition of the extract. Finally, the malt, malted rice or malted soybeans can be used several times as a raw material for the extraction process and therefore, the cost of the process for extracting the effective ingredient for improving the quality of foods is low.

What is claimed is:

1. A consecutive extraction device for extracting an extract of an effective ingredient from malt, malted rice or malted soybeans comprising:

a supply tank for malt, malted rice or malted soybeans;

two or more extraction units for extracting the effective ingredient from the malt, malted rice or malted soybeans;

a conveyance means for conveying the malt, malted rice or malted soybeans from the supply tank into the extract units;

a drying means for drying malt, malted rice or malted soybeans conveyed from the extract units; and, wherein each extract unit includes an atomization chamber in which a liquid material is atomized, a decompression chamber in which malt, malted rice or malted soybeans is maintained at a reduced pressure, a cooling chamber, circulatory pipes connecting the atomization chamber to the decompression chamber, the decompression chamber to the cooling chamber and the cooling chamber to the atomization chamber, a heating means in the circulatory pipe between the atomization chamber and the decompression chamber for heating a vapor, mist or mixture transferred from the atomization chamber to the decompression chamber through the circulatory pipe; and, an absorption fan provided in the circulatory pipe between the cooling chamber and the atomization chamber; and, further wherein the conveyance means provided between the supply tank and the drying means includes a conveyance pipe penetrating the decompression chamber, a conveyance screw provided at one side of the conveyance pipe for transferring malt, malted rice or malted soybeans inside the conveyance pipe and a ventilation portion provided inside the conveyance pipe within the decompression chamber.

2. The consecutive extraction device of claim 1 further including an adjustment board for making the thickness of the mass of malt, malted rice or malted soybeans being conveyed to the decompression chamber through the conveyance pipe uniform and a stirring device for stirring the mass of malt, malted rice or malted being conveyed.

3. The consecutive extraction device of claim 1 further including a means for adjusting the quantity of ventilation provided at a ventilation portion and wherein the ventilation means includes a net and a slideable plate provided beneath the net.

4. The consecutive extraction device of claim 1 wherein the conveyance means is operative during an extraction operation and malt, malted rice or malted soybean is transferred in the decompression chamber at a predetermined speed.

* * * * *

Disclaimer and Dedication 5,170,697—Nobuyoshi Kuboyama, Carlisle, Mass., EXTRACTION APPARATUS, PROCESS AND PRODUCT PRODUCED THEREBY, Patent dated Dec. 15, 1992, Disclaimer and dedication filed October 9, 2002, by the inventor.

Hereby disclaims and dedicates to the public all claims of said patent.

*(Official Gazette, June 24, 2003)*